United States Patent [19]

Rabe

[11] Patent Number: 4,571,475

[45] Date of Patent: Feb. 18, 1986

[54] INTERNAL BORE WELDING TORCH HAVING REMOVABLE FLEXIBLE WAND FOR REMOTE WELDING

[75] Inventor: George B. Rabe, Sparta, N.J.

[73] Assignee: Foster Wheeler Energy Corporation, Livingston, N.J.

[21] Appl. No.: 604,557

[22] Filed: Apr. 27, 1984

[51] Int. Cl.[4] .............................................. B23K 9/225
[52] U.S. Cl. .................................. 219/60 A; 219/60.2
[58] Field of Search ................... 219/60 R, 60 A, 60.2

[56] References Cited

U.S. PATENT DOCUMENTS 3,493,716  2/1970  Martin ............................... 219/60 R
4,147,920  4/1979  Merrick et al. .................... 219/60 A Primary Examiner—C. L. Albritton
Assistant Examiner—Alfred S. Keve
Attorney, Agent, or Firm—Marvin A. Naigur; John E. Wilson; Martin Smolowitz

[57] ABSTRACT

An internal bore welding torch assembly and method for use in making remote arc welds inside metal tubes. The torch assembly includes a torch body unit of plastic electrical insulating material, to which is connected the necessary welding services of coolant, shield gas, and electric power. The body unit contains a removable and rotatable welding wand which is made of flexible plastic and has a welding electrode oriented radially at its outer end. For making a weld, such as for repairing a damaged tube, a metal sleeve is first inserted into the tube the flexible welding wand is then inserted into the tube and the radial electrode positioned adjacent an end of the sleeve. The flows of coolant and shield gas are provided through the torch body unit to the wand, and the wand is rotated while making the metal arc welds desired to seal weld the sleeve ends to the tube.

11 Claims, 5 Drawing Figures

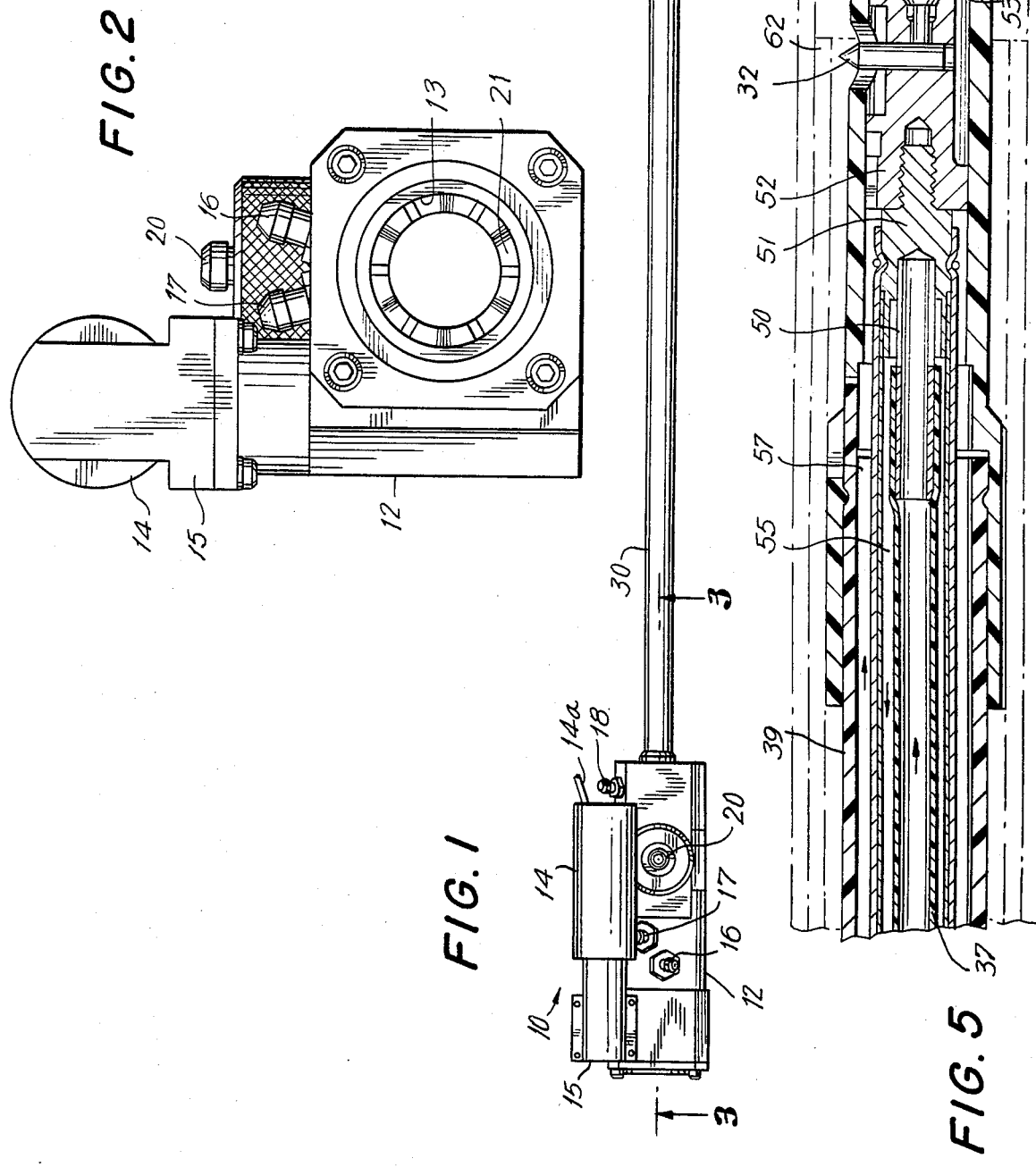

INTERNAL BORE WELDING TORCH HAVING REMOVABLE FLEXIBLE WAND FOR REMOTE WELDING

BACKGROUND OF INVENTION

The present invention pertains to an internal bore welding torch apparatus and method for its use in making welds in remote locations. It pertains particularly to such a welding torch apparatus and method for which an elongated flexible welding wand is removable from the torch body.

Various arrangements and designs of torches used for internal arc welding in remote places are known. For example, U.S. Pat. No. 3,461,269 to Stevens et al discloses an elongated water-cooled torch having a rotatable stem for internal pipe welding process using inert gas shielded non-consumable electrode arc welding. Also, U.S. Pat. No. 3,493,716 to Martin discloses an internal tube welding torch having a radial electrode end integrally and rotatably attached to a motor drive end by a plastic insulating tube and using a worm and pinion drive for the tube.

U.S. Pat. No. 3,962,767 to Byerley et al discloses a method for repairing a damaged heat exchanger tube in which a sleeve is inserted into the tube and welded in place. U.S. Pat. No. Re. 30,802 to Rogers discloses a method for repairing a degraded tube wall by securing a sleeve within the tube. However, further improvements for such internal tube welding torches are needed and have been sought.

SUMMARY OF INVENTION

The present invention provides an improved internal bore welding torch apparatus and method for making remote arc welds within tubular passages. The welding torch assembly is adapted for making welds in remote locations such as within tubes and comprises a torch body unit, including connection means for supplying all essential services of cooling fluid, shield gas, and electric power to the body unit, an elongated flexible welding wand unit removably and rotatably attached to the torch body in axial slidable engagement therewith, with the wand unit containing a cooled welding electrode positioned radially at the wand outer end; longitudinal passage means within said wand for providing flows of coolant and shield gas to said electrode; and drive means associated with the torch body for rotating the removable welding wand at a controlled rate while supplying cooling fluid, shield gas and electrical power to the electrode needed for making an arc weld at the remote inner location. The torch body unit is made of a plastic electrical insulating material. The removable welding wand is usually cylindrically shaped and is made of a flexible plastic electrical insulating material and utilizes a flexible electrical conductor. A rotatable electrical contact is provided in the torch body for transmitting electrical power from the body through the rotatable wand to the welding electrode, which is water cooled and shielded by an inert gas during welding.

The welding method of the present invention comprises inserting a metal sleeve into a damaged metal tube; inserting into the metal tube a welding wand containing a radially oriented electrode, and positioning the welding electrode adjacent an end of the sleeve; and then providing flows of cooling fluid, shield gas and electrical power to the electrode to cool and gas shield the electrode and for rotating the welding wand within the tube and striking an electric arc between the electrode and the sleeve end, so as to fuse weld the sleeve end to the tube inner wall. The torch body is usually first located externally adjacent the outer end of a tube being welded and the welding wand is next inserted through the torch body and then into the tube to be welded. The welding wand is rotated and an electric arc struck to make the weld, after which the welding wand is withdrawn. The torch body is moved to a new location for making further welds.

BRIEF DESCRIPTION OF DRAWINGS

FIG. 1 shows a top plan view of the welding torch assembly according to the invention, with the wand unit inserted into the torch body unit.

FIG. 2 shows a rear end view of the welding torch body unit with the wand unit removed.

FIG. 5 shows a longitudinal cross-sectional view of the tip end of the flexible welding wand unit taken at section 5—5 of FIG. 1, and positioned within a tube being welded.

DESCRIPTION OF INVENTION

Figure 3:
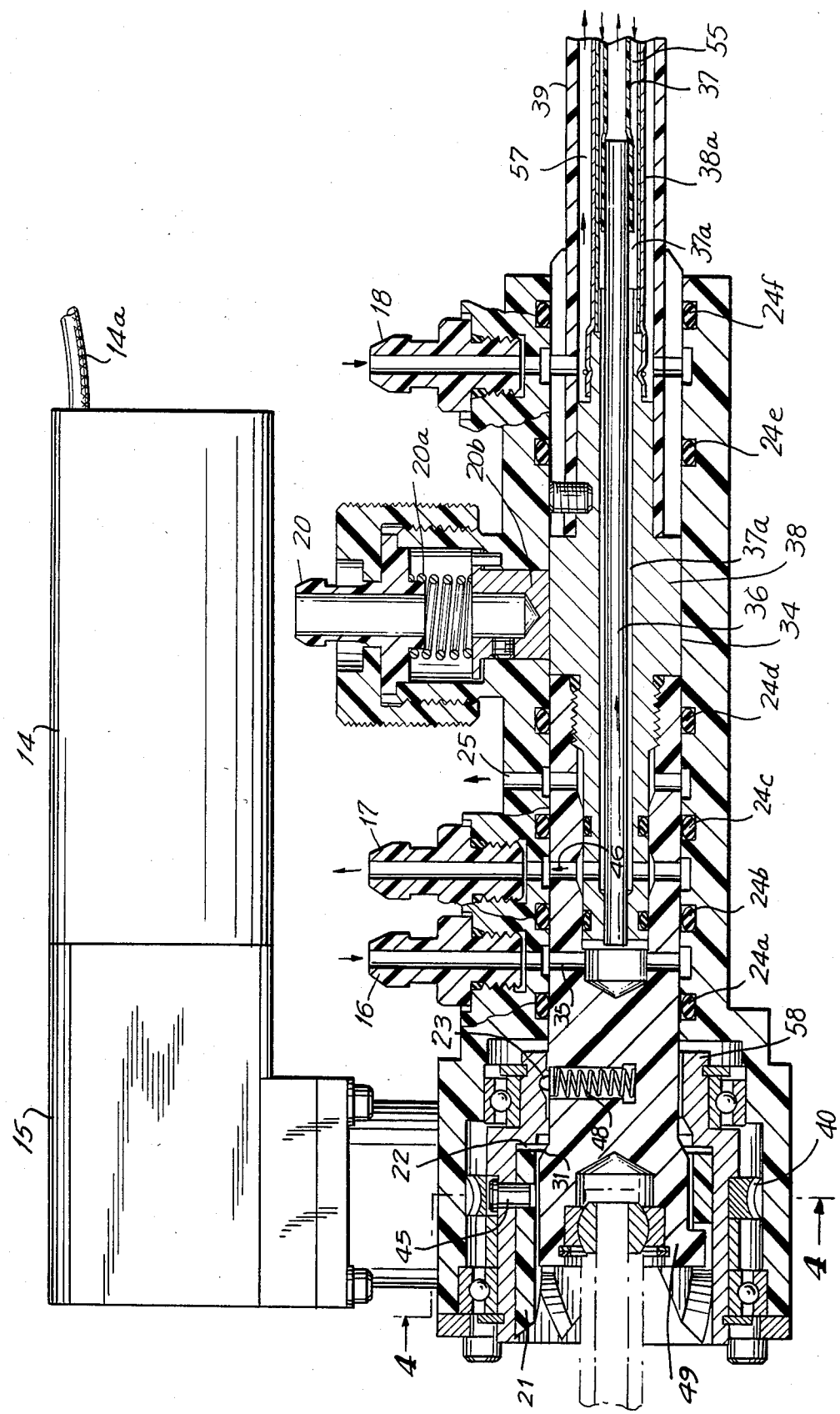
FIG. 3 shows a longitudinal partial cross-sectional view of the welding torch assembly taken at section 3—3 of FIG. 1.

The welding torch assembly of the present invention is designed specifically for performing arc welding in remote areas, such as those areas that are radioactive and thus require that human exposure be limited to an absolute minimum. Such applications preclude line-of sight access to the weld area and thus require the welding equipment to be sufficiently flexible so that the electrode end can be inserted into tubes by bending around intervening obstacles. One such example is the installation of repair sleeves into damaged steam generator tubes in nuclear power plants. In this application, there is an enormous financial advantage for the utility if the useful life of a steam generator can be extended by repairing damaged tubes, as compared to the alternaive of steam generator replacement. This welding torch assembly and method are designed specifically for such tube repair purpose.

The welding torch assembly of the present invention consists of two basic components, namely, a torch body unit and a flexible removable welding wand unit removably received in the body unit. The body unit has provision for all the services required for the welding wand unit to be connected to it, including connections for coolant fluid, shield gas and electric power, and the body unit includes a motor drive means to rotate the flexible welding wand. During operation of the torch, the torch body can be located over a tube to be sleeved by using a robotic device. When using the torch assembly in regions of high radiation, the body end remote from the tube being welded will have a flexible conduit attached to the tube, which leads to the outside of the steam generator channel where the radiation level is low. The flexible welding wand is inserted through this conduit, with the welding wand and head passing through the torch body unit and into the sleeve which is to be welded to the tube. The wand location along the length of the tube and sleeve is controlled by the bottoming out of the rotor end of the wand unit in the torch body unit. When such bottoming contact occurs, the welding wand electrode is properly located in the sleeve. The flows of cooling water, shield gas, and welding current and rotary motion can now be transferred from the torch body unit to the flexible welding wand and the radial electrode, and the weld(s) made as desired. Repair of leaking tubes is accomplished by slipping a close fitting sleeve inside the damaged tube, positioning the sleeve so as to bridge the leaky area, and then successively welding the sleeve ends to the base tube with internal bore welds.

Important and unique features of this internal bore welding torch assembly include the torch body and the flexible removable welding wand made separate as units for greater flexibility in use. In conventional internal bore welding torches, these elements are provided as one integral unit. The torch body unit is fabricated from a dimensionally stable plastic material which is also an electrical insulator, so that separate electrical insulation in the body unit is not required. The welding wand unit is constructed from a flexible electrically insulating plastic material, which permits it to be bent and inserted through curved conduits. The wand can be made any practical length required. Cooling water is carried to very near the welding electrode and cools the copper fittings which hold the electrode. Also, a flexible braided electrical conductor which connects the wand unit rotor to the welding electrode is water cooled.

Referring now to the drawings, FIG. 1 depicts a general overall view of the welding torch assembly 10, which comprises a torch body unit 12 and an elongated flexible wand unit 30 which is removably and rotatably inserted into the torch body unit. Electric drive motor 14 is provided with the body 12 and is arranged to rotatably drive the weld wand unit 30 through a right angle gear reducer 15, which is rigidly mounted on body unit 12 at the rear portion thereof. Electric power is provided to motor 14 through conductor 14a. At the opposite or outer end of the elongated wand unit 30 a welding electrode 32 is located, which wand is provided with a tip 33 for protection during insertion of the wand into a tube for making a weld therein. The wand unit 30 can be made any desired practical length, and will usually be at least about 2 ft. long and usually need not exceed about 30 ft. long. The radius of curvature for wand 30 can be less than 20 ft. and usually not less than about 5 feet.

A rear end view of the torch body unit 12 without the torch wand unit 30 in place therein is shown in FIG. 2. As seen in the FIG. 2 drawing, the torch body has a central cylindrical opening 13 therein extending through the body unit and contains multiple drive splines 21, which are adapted for receiving the weld wand unit 30 for a snug fit therein. Connection 16 is provided in torch body 12 for flowing a cooling fluid, preferably water, into and through the torch body and then longitudinally outwardly through longitudinal passages in the wand unit 30 to near the welding electrode 32 to cool same, then return flow through outlet connection 17. Also, a connection 18 is provided in body unit 12 for supplying a flow of an inert shield gas such as argon or helium to surround the welding electrode 32, which is oriented radially at the opposite end of the welding wand 30. The ends of connections 16, 17 and 18 are adapted to receive suitable hose connections (not shown) for carrying flows of the required cooling fluid in and out, as well as for the shield gas supply. D.C. electric power is provided to the torch body 12 and thence to the elongated welding wand 30 through a removable connector 20.

A partial cross-sectional view of the torch assembly 10 is shown in FIG. 3, with the welding wand unit 30 being shown inserted into torch body 12. As seen in FIG. 3, the weld wand unit 30 is inserted into the cylindrical opening 13 of body 12 and has inclined or tapered surface 31 seated against body unit annular surface 22 therein. The wand unit 30 is sealably attached to the torch body 12 by six O-ring or similar type seals 24a, 24b, 24c, 24d, 24e, and 24f, which seal against the wand outer cylindrical-shaped surface 34 and are located so as to effectively separate the fluid flows of coolant and shield gas from each other. By this construction, connection 16 provides cooling water flow through radial passageway 35 and metal inner tube 36, which is sealably connected to inner flexible plastic tube 37. The return water flows through annular space 55 and thence out through radial passageway 46 and connection 17. A vent opening 25 is provided in the torch body 12 to accommodate any cooling water leakage past the seals 24b and 24c to the outside.

Electrical power is provided to the electrode 32 through the connector 20, which is spring-loaded by compression spring 20a so as to maintain electrical contact between contactor 20b and the wand 30 while it is being rotated for making a weld. The electrical connector 20 and contactor 20b are maintained in contact with central conductor rotor 38, from which electrical power is conducted to the electrode 32 through flexible tubular shaped braided electrical connector 38a. The wand unit 30 is enclosed by an outer flexible tube 39. Inert shield gas provided at connection 18 flows through annular passageway 57 to surround the electrode 32. The welding wand 30 is retained in position within the opening 13 of body unit 12 by a spring-loaded detent means 48, which contacts circular groove 23 in bearing shaft assembly 58.

Figure 4:
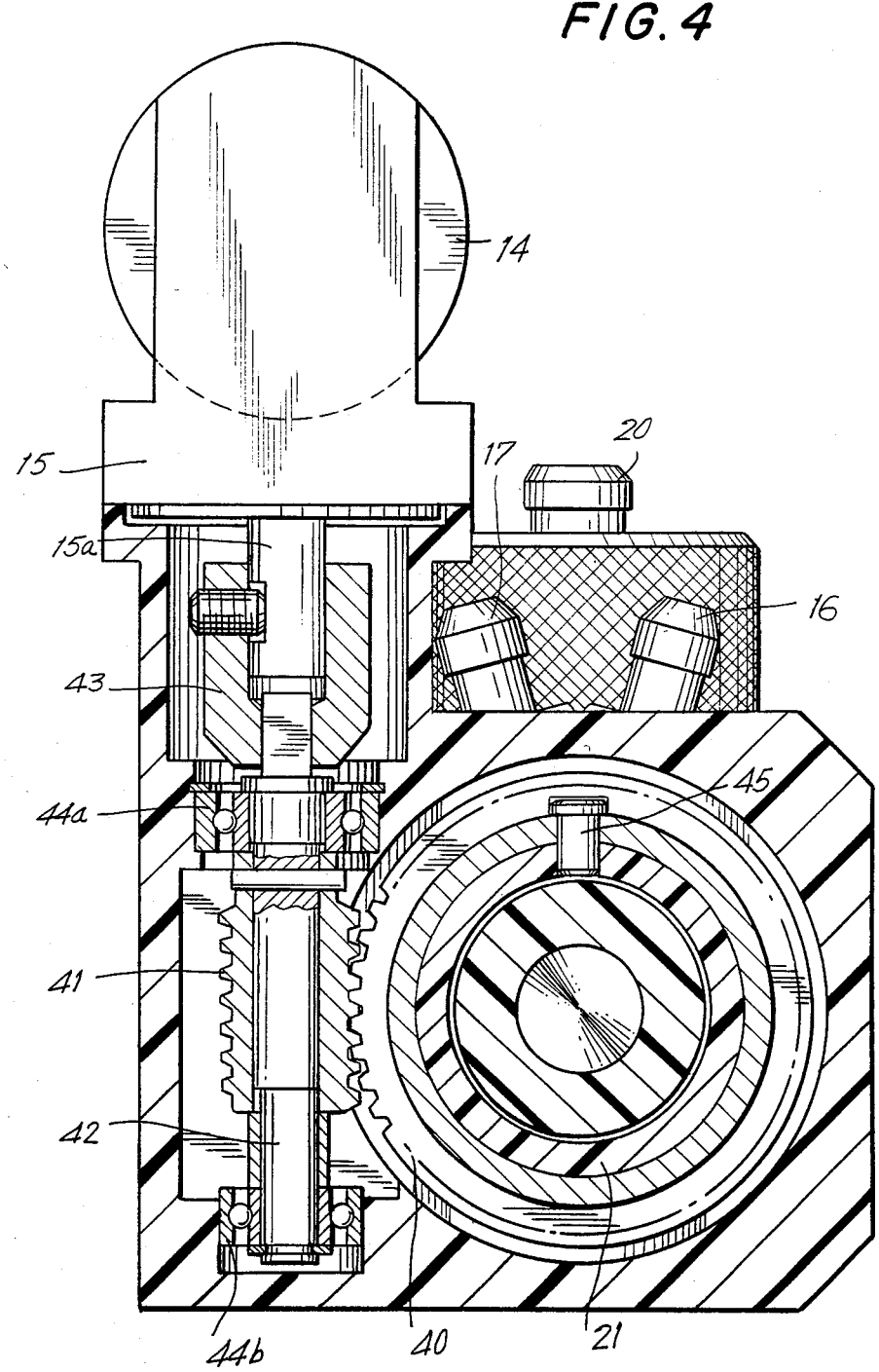
FIG. 4 shows a transverse cross-sectional view of the welding torch assembly taken at section 4—4 of FIG. 3.

During use of the internal bore welding torch, the wand unit 30 is rotated at variable speed by electric motor 14 through gear reducer 15, which is adapted to drive a ring gear 40 by pinion gear 41, as is shown in the FIG. 4 sectional drawing. The pinion gear 41 and shaft 42 are supported at each end by suitable bearings 44a and 44b, while shaft 42 is connected by coupling means 43 to the gear reducer 15. The ring gear 40 rotatably drives splines 21 through drive pin 45. By this arrangement, the splines 21 rotate welding wand unit 30 through axial slidable engagement with multiple radial spurs 49 located at the rear end of the wand unit.

The torch body 12 is made from a dimensionally stable plastic material having good electrical insulation characteristics, such as "Delrin" produced by DuPont Co. The flexible plastic tube 37 for coolant flow is made of polyvinyl chloride (PVC) and outer tube 39 is made of tetrafluoroethylene (TFE) which is obtainable as "Teflon" from DuPont Co.

A cross-sectional view of the tip end of wand unit 30 positioned within a tube and sleeve to be welded into the tube is shown by FIG. 5. As shown, the flexible plastic tube 37 is sealably connected to a second metal tube 50 attached to metal adapter 51 for providing coolant flow to cool electrode holder 52. Electrode 32 is clamped in holder 52 in a radial position as desired by threaded pin 53, which is locked in position by nut 54. The locking nut 54 is covered by nose piece 33, which is made of plastic material suitable for high temperature usage. Nose piece 33 preferably has a pointed shape so as to facilitate the entry of wand unit 30 into narrow passages and tubes in which the welding is to be performed.

The welding wand 30 is cooled by water flowing through the central plastic tube 37 and metal tube 50 and returning through annular space 55 adjacent tubes 50, 37 and 36. Because the return coolant in annular space 55 also flows adjacent to electrical conductor tube 38a, the coolant effectively cools the conductor. The shield gas flows from connection 18 in body unit 12 through annular passageway 57 and out past electrode 32 to inert gas shield the electrode and electric arc from air infiltration during the welding step. The D.C. electric power is supplied to electrode 32 from connector rotor 38 through flexible conductor 38a and electrode holder 52, which is made of copper. As generally shown in FIG. 5, the torch wand 30 is inserted into a tube 60 containing a sleeve 62, and the electrode 32 is positioned adjacent one end of the sleeve 62 within the tube (shown in phantom lines).

In the method of the invention for making welds within confined spaces and tubes, such as for repairing damaged pressurizable tubes by seam welding a metal inner sleeve to the tube, a close fitting metal sleeve 62 is first inserted within the tube 60 and located oposite the tube damage or rupture point, as generally shown in FIG. 5. The welding torch body unit 12 is suitably positioned at the accessible end of the tube, and all the service connections of cooling water, shield gas, and electric power are made to the torch body 12 as described above. With the torch body 12 in proper position relative to the tube 60, the welding wand unit 30 is inserted into the body opening 13 until the wand is seated in the body, the seal rings 24a–24f are sealed against cylindrical surface 34, and the multiple radial spurs 49 are engaged with the rotor drive splines 21 and bearing shaft assembly 58. The flows of cooling water and shield gas are commenced, and the torch wand unit is rotated within tube 60 at a desired speed, such as about 1–3 rpm. An electric arc is struck between the electrode tip end 32 and the end of sleeve 62, so as to fuse and seal weld the sleeve end onto the tube to bridge a damaged or ruptured portion of the tube 60. After making the weld, the welding wand 30 is withdrawn. A shorter wand unit 30a is inserted within the torch unit 12 and the other end of the sleeve 62 is also welded to tube 60 in similar manner as described above. The welding wand is then withdrawn and the torch body moved to the next location.

The welding torch assembly of the present invention is useful for making welds within tubes having inside diameters greater than about 0.625 inch. The maximum coolant pressure that can be used is usually about 50 psig, however adequate cooling of the torch is usually achieved at coolant pressure at least about 10 psig. Coolant leakage through vent 25 is used to detect any leakage of the O-ring seals 24b or 24c, and to exclude coolant from the portions of the torch body containing the electrical conductor parts 20b and 38. The D.C. electrical power rating for the welding torch is 9 volts at 40–60 amperes.

Although the welding torch apparatus and remote welding method of this invention have been described broadly and in terms of a preferred embodiment, it is understood that modifications and variations can be made within the scope of the invention, which is defined by the following claims.

I claim:

1. An internal bore welding torch assembly adapted for making welds in remote locations, said torch assembly comprising:
   (a) a torch body unit, including connection means attached to said body for supplying flows of a cooling fluid, shield gas, and electric power to the body unit, said body unit having a central cylindrical-shaped opening therein for receiving an elongated welding wand unit in slidable engagement therein;
   (b) an elongated flexible welding wand unit removably and rotatably received in said torch body unit, said elongated wand containing a welding electrode oriented radially at the wand outer end, longitudinal passage means located within said wand for providing flow of coolant and shield gas from said body unit to said electrode, and elongated flexible electrical connection means for supplying electrical power to said electrode; and
   (c) drive means associated with said torch body unit for rotating the removable welding wand unit at a controlled rate while supplying said cooling fluid, shield gas and electric power to said electrode during making an arc weld at the remote location, said drive means including an electric motor and gear reducer mounted on said torch body unit at the rear portion thereof, said gear reducer including splines for contacting said removable wand unit.

2. A welding torch assembly according to claim 1, wherein said torch body is made of plastic electrical insulating material.

3. A welding torch assembly according to claim 1, wherein said welding wand unit is cylindrically shaped and made of flexible plastic electrical insulating material.

4. A welding torch assembly according to claim 1, wherein a rotatable electrical contact is provided on said wand unit within said torch body between said connection means for the coolant and shield gas for transmitting electrical power from the body to the rotatable wand unit.

5. A welding torch assembly according to claim 1, wherein the passage means for shield gas supply is made of a flexible plastic material.

6. A welding torch assembly according to claim 1, wherein said electrical connection means includes a braided electrical power conductor located within said torch wand, said conductor electrical being water cooled.

7. A welding torch assembly according to claim 1, wherein said rotatable welding wand unit is removably and sealably attached to said torch body unit by multiple o-ring seals located in the torch body so as to seal against the mating outer cylincdrical surface of the wand unit.

8. A welding torch assembly according to claim 7, wherein a vent is provided in said body unit between the coolant connection means and the electrical connection means.

9. A welding torch assembly according to claim 1, wherein said elongated wand unit is rotated by a pinion and worm gear located at the rear portion of the torch body.

10. A welding torch assembly according to claim 1, wherein separate connections are provided in said torch body for supplying the cooling fluid, shield gas and electrical power.

11. An internal bore welding torch assembly adapted for making welds in remote locations, said torch assembly comprising:
- (a) a torch body unit composed of a plastic electrical insulating material, and including connection means attached to said body unit for supplying flows of a cooling fluid, shield gas and electric power to the body unit; said body unit having a central cylindrical-shaped opening therein for removably receiving an elongated welding wand unit in slidable engagement therein;
- (b) an elongated flexible plastic welding wand unit removably and rotatable received in said torch body unit, said wand unit containing a water cooled welding electrode and holder positioned radially at the wand outer end; longitudinal passage means located within said wand for providing flow of coolant and shield gas from said body unit to said electrode, and elongated flexible electrical connection means for supplying electrical power to said electrode; and
- (c) electrical drive means provided with said torch body unit at the rear portion thereof for rotating the removable welding wand at a controlled rate while supplying said cooling fluid, shield gas and electric power to said electrode during making of an arc weld at the remote location, said drive means including an electric motor and gear reducer mounted on said torch body unit at the rear portion thereof, said gear reducer including splines for contacting said removable wand unit.

* * * * *